Sheet 1, 5 Sheets.
J. F. Cleu.
Port Stopper.
N⁰ 45,475.  Patented Dec. 20, 1864.
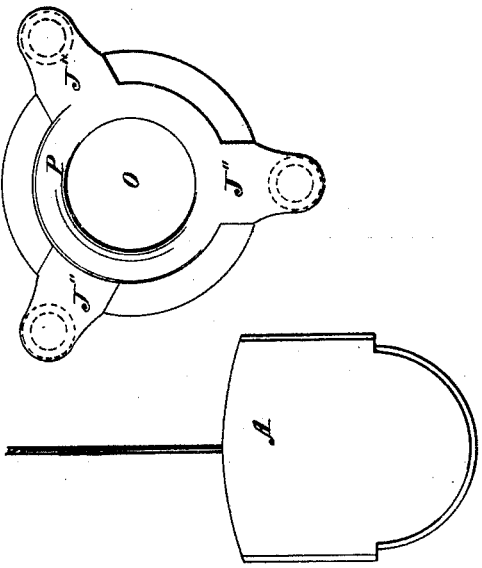
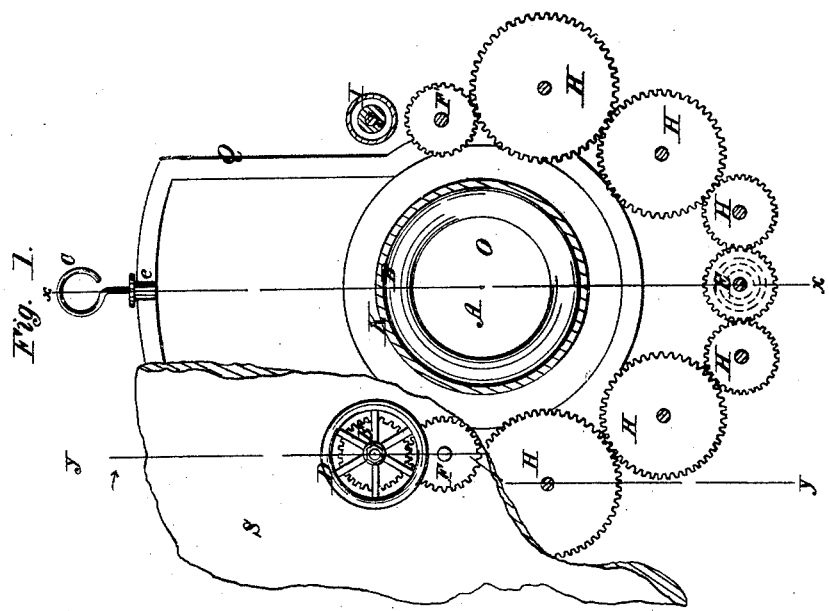
Witnesses,
Inventor, J. F. Cleu.
Port Stopper.

Nº 45,475. Patented Dec. 20, 1864.

Witnesses,

Inventor,

J. F. Cleu.
Port Stopper.

N° 45,475.   Patented Dec. 20, 1864.

Witnesses.    Inventor.

J. F. Cleu.
Port Stopper.

No. 45,475.  Patented Dec. 20, 1864.

Witnesses,  Inventor,

J. F. Cleu.
Port Stopper.

No. 45,475. Patented Dec. 20, 1864.

Witnesses,

Inventor,
John F. Cleu
per Munn & Co.
Attorneys

UNITED STATES PATENT OFFICE.

J. F. CLEU, OF NEW YORK, N. Y.

IMPROVED SUBMARINE PORT-HOLE.

Specification forming part of Letters Patent No. 45,475, dated December 20, 1864.

*To all whom it may concern:*

Be it known that I, JOHN F. CLEU, of the city, county, and State of New York, have invented new and useful Improvements in Submarine Port-Hole Shutters; and I do hereby declare that the following is a full, clear, and exact description thereof, which will enable others skilled in the art to make and use the same, reference being had to the accompanying drawings, forming part of this specification, in which—

Figure 5:
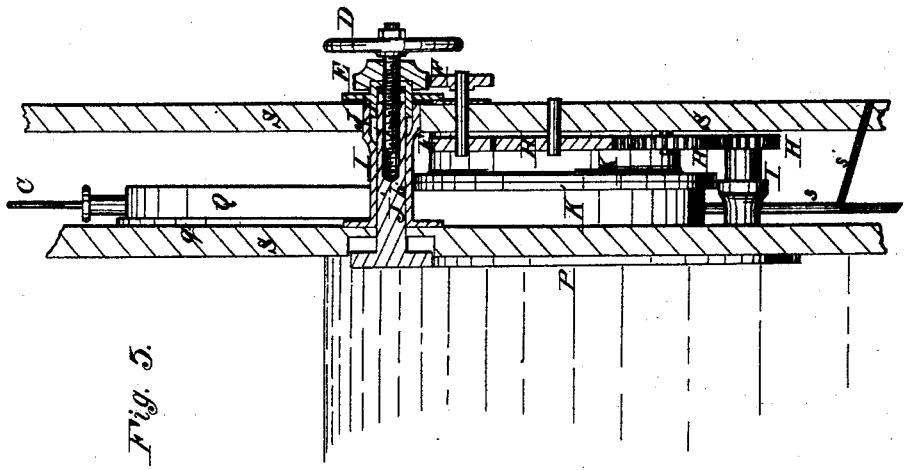
Figure 4:
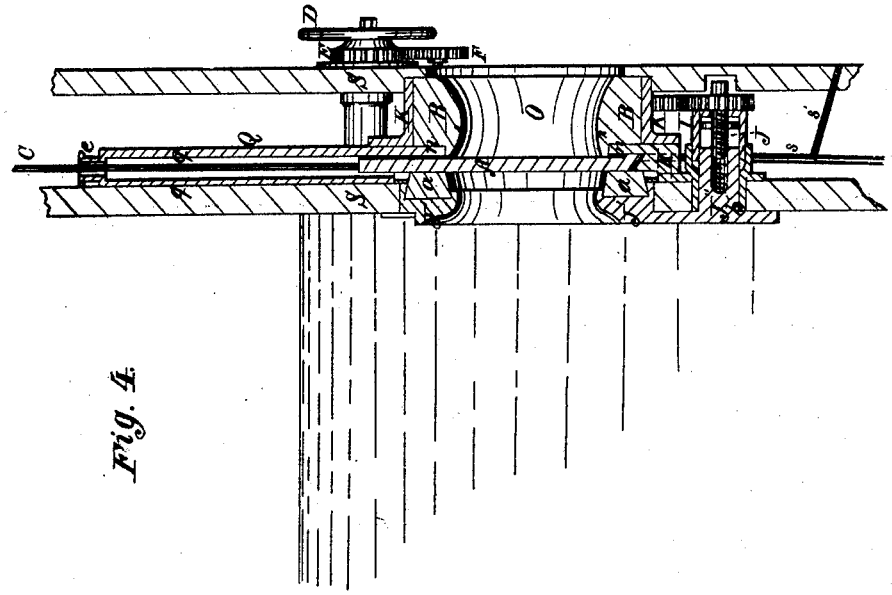
Figure 7:
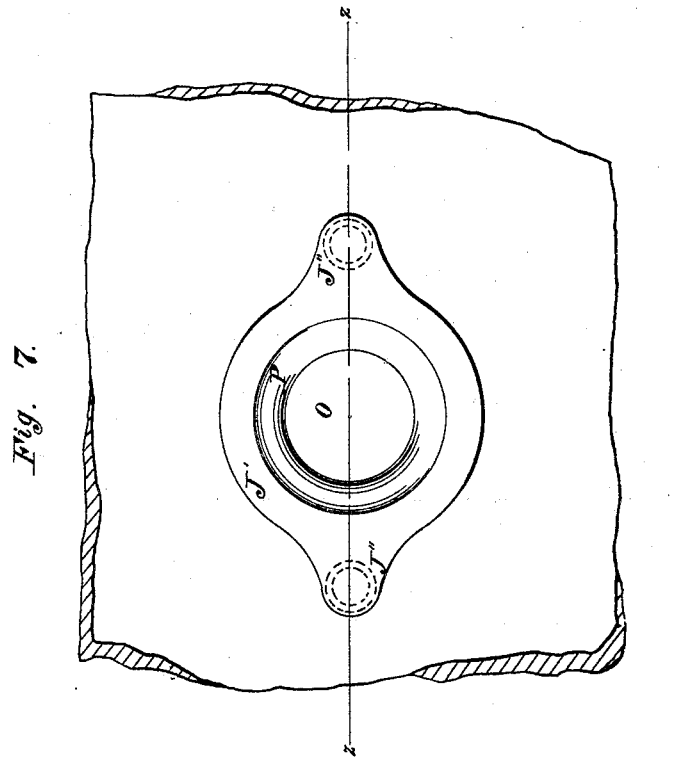
Figure 6:
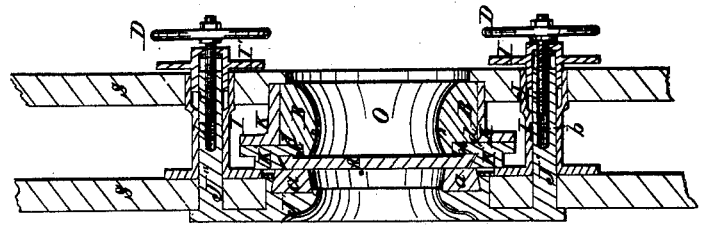
Figure 8:
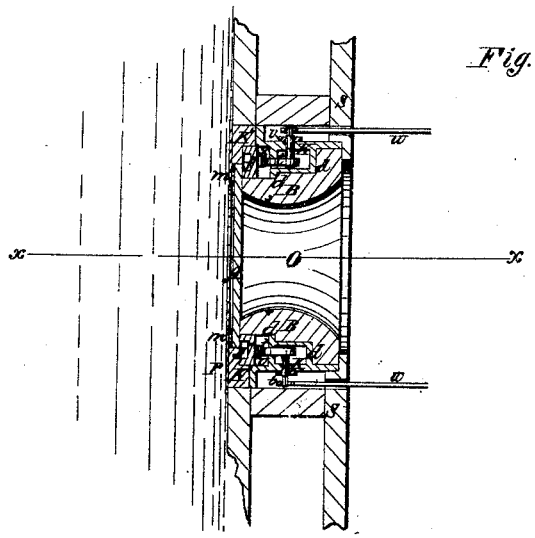
Figure 10:
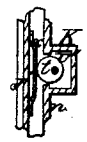
Figure 9:
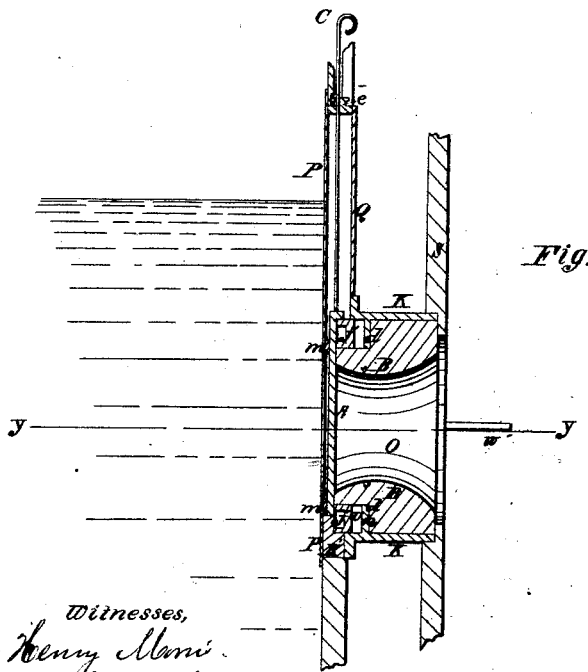
Figure 12:
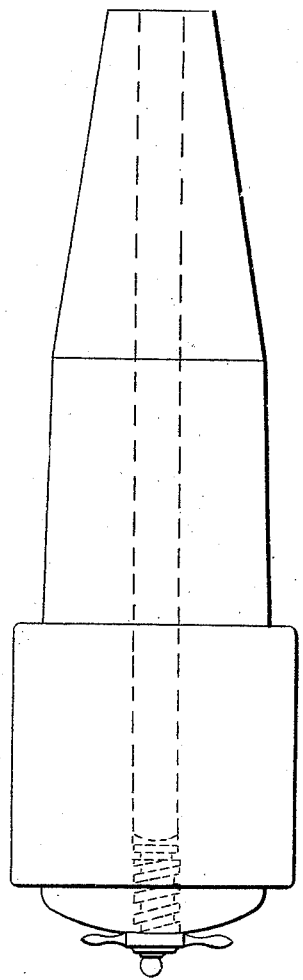
Figure 11:
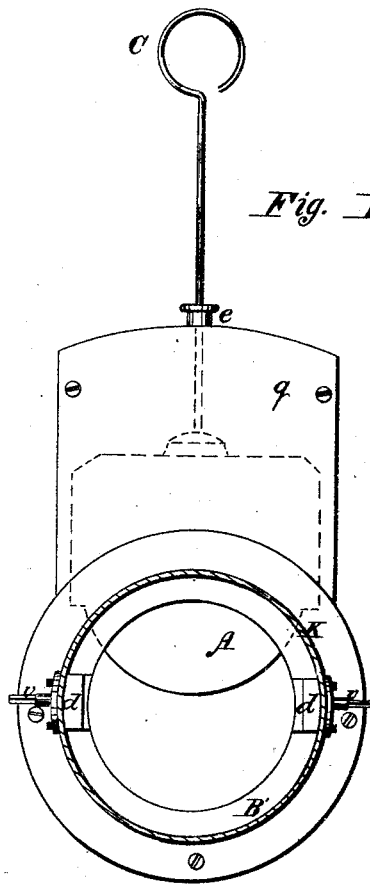

Figure 1 represents a portion of the side of a vessel or framing containing my improvements, the framing being partly broken away to show a train of gearing by means of which the joints of the port-hole may be made tight, as hereinafter described. Fig. 2 is a detailed view of the gate or shutter. Fig. 3 is an outside view of the port-hole when the several parts are made as shown in Fig. 1. Fig. 4 is a vertical transverse section on the line $x$ of Fig. 1. Fig. 5 is a vertical transverse section on the line $y$ of Fig. 1. Fig. 6 is a transverse section of Fig. 7, taken on the horizontal line $z$. Fig. 7 is a back or outside view of the port-hole slightly changed as compared with Figs. 1 and 3, but upon the same principle of construction. Fig. 8 is a horizontal transverse sectional view of a port-hole, also containing my improvements, taken on the line $y$ of Fig. 9. Fig. 9 is a vertical transverse section taken on the line $x$ of Fig. 8. Fig. 10 is a detailed view of the cam or eccentric $t$ and its box, shown in position in Fig. 8. Fig. 11 is an elevation of the port-hole and shutter, the elastic ring B being removed. Fig. 12 is a representation of a piece or ordnance of the shape required to operate with the port-hole hereinafter described.

Similar letters of reference indicate like parts.

My object is to construct a port-hole or embrasure for submarine firing. To construct such a port-hole it is necessary to provide not only all the usual facilities for the discharge of ordnance which are required in an embrasure, but to provide also suitable means and devices to prevent the water without from rushing through the port during the action.

The invention by which I have accomplished this object is illustrated in the drawings hereto annexed, which show several modifications thereof, all, however, illustrating and constructed upon the same principle.

I will first describe the manner of carrying out my invention, which is set forth in Figs. 8, 9, 10, and 11 of the drawings.

S represents the wall of a ship or any submarine framing containing a port-hole or embrasure, O, below the water-level, constructed after my invention. In a suitable opening in the framing S, I fix a metallic ring, K, of circular outline and long enough to reach from the front nearly to the back of the framing S. It is properly connected to a metallic casing, K', and to the upright metallic frame Q at those points where they come in contact, (see Figs. 4, 5, and 6,) so as to be not only firm, but also water-tight. The upright frame Q is hollow, its front and back plates $q$ being separated at their edges by the casing K', which is set in the framing S, and whose outline is like the outlines of the ring K and plate $q$ shown in Fig. 11. The joints formed about this casing are to be made water-tight. The plate P has an opening through it to coincide with the port-hole O, and a packing, $m$, which I prefer to be of cork, is secured to it, as shown in Figs. 8 and 9, so as to make a tight joint with the shutter or gate A. If it is preferred, the packing $m$ may be secured to the shutter. The sides of the casing K form guides for the shutter A, within which it moves, and the bottom of the gate, when it is closed, rests upon the lower side of the casing. The hollow frame Q forms a stuffing-box, within which the gate is received when it is raised by its handle C, which moves in a stuffing-box, $e$, constructed for it in the top of the frame. A ring, $n$, is cast upon the inner circumference of the ring K at right angles therewith, so as to form with the casing K' a circular space, U, within which is placed loosely a ring, J', whose cross-section resembles the letter U. Two boxes, U', are formed in the interior of the ring K at opposite points in the same diametrical line, so that the pressure of the eccentrics upon the ring shall be uniform and equal, in each of which is placed an eccentric, $t$, whose shafts V are journaled in the ring K, and project outside that ring far enough to be operated by wrenches W or by screws and band-wheels or any suitable mechanical device. The eccentrics project through slots cut in the rings n, so as to come in contact, when their greatest diameter is in that direction, with the back of the movable ring J′, in order to force it up against the gate A. Elliptical springs x, properly secured upon the back of the ring J′, receive the impact of the eccentric. These eccentrics can be operated in the manner here shown, or by screws, or by any other mechanical device.

B is an elastic ring whose exterior circumference is to take the form shown in Figs. 8 and 9. It extends from the front of the embrasure to the gate A, thereby inclosing the movable ring J′. It is formed with a shoulder, d, which abuts against the inner ring, n, and the eccentric boxes U′, between which and the framing S it is securely held against lateral displacement in either direction.

In its longitudinal section its interior forms an irregular curve, with its greatest convexity at or near 2 in Figs. 8 and 9, and declining thence in either direction. The embrasure of the port-hole will therefore be of greater diameter than the outer face of the port-hole.

The shutter may be raised by any proper means through the agency of steam or other power.

The elastic ring B may be made more secure in its receptacle, if it is found desirable, by means of a metal ring fitted within its inner circumference, through which bolts may be passed to secure it to the ring K, or else to the ring K′ when the modification shown in Fig. 6 is adopted.

My submarine port-hole thus constructed, it will be seen, consists essentially of a metallic frame or framing, most of whose parts may be cast in one piece, so as to be easily fitted in the sides of a ship, or in any framing for defensive purposes, and whose embrasure is formed of an elastic ring or surface, whose inner circumference is convex, the line of greatest convexity occuring at about two-thirds the depth of the embrasure, and its sides receding thence on a curved line toward the edges. The port-hole will thus resemble in horizontal section a figure composed of two truncated cones of unequal height united at their bases.

The operation is as follows: The shutter A being closed, the eccentrics t are brought up against it to press it tightly against the packing m of the back plate, P. When the gun is ready to be fired, its muzzle is brought up within the embrasure, within which it is intended to fit so tightly as to form a water-tight joint at about the point of greatest convexity 2. The shutter is then raised, and the muzzle of the gun is forced through the embrasure, the elastic sides thereof yielding and embracing the sides of the gun tightly. The shutter is then allowed to descend so as to rest upon the muzzle or forward part of the gun. When the gun is fired, its recoil sends it back through the embrasure, when the shutter, being no longer supported, immediately falls down to its place, and the movable ring J′ is driven up against it by the eccentrics t. When the gate descends, it may inclose between its lower edge and its seat on the casing K′ a thin layer of water. This water is allowed to escape by means of a pipe, S, leading through the ring K′, (see Figs. 4 and 5,) into the bilge of the ship or into any waste channel. This pipe S may be intersected by a pipe like S′ passing through the inner walls of the ship and terminating there, and their point of intersection may be fitted with a two-way cock, which, when the port-hole is not in use, may be so turned as to open the communication between the two pipes and close the pipe S below the point of intersection. By this means any leakage of water at any of the joints of the port-hole will become known at once by its passage through the pipe S into the gun-room. Figs. 1, 3, 4, and 5 show an arrangement for accomplishing the same results by means of equivalent devices.

In the example here shown the joints of the gate are made tight by means of screws J, which pass through the framing S, and engage an internal screw-thread cut in bosses b, which project inward from the arms J″ of the ring J′. The shanks of the screws have each a gear-wheel, E, keyed upon them on the outside of the framing, and also a hand-wheel D. The ring J′ in this example, is placed without the ring K; and in order to enable it to be acted upon by means of the springs, it has arms J′, which extend radially therefrom and support at their extremities the bosses b, which are engaged by the screws J. A circular grove is cut upon the inner face of the ring J′, to sustain an elastic packing-ring, a, which bears against the face of the gate A. The gate A travels in guides, or in a seat cut for it upon the inside of the hub K′ of the ring K. The bosses are inclosed within collars I, which are secured in any suitable manner in the framing S, and in the heads I′, of which the screws J are journaled. Each of the screws J may have a hand-wheel, or they may be geared together by a train of gearing, F, F′, and H, so that all the screws may be operated by rotating one wheel D. When the hand-wheel D is rotated, the screws, which are not allowed endwise motion in their journals, operate to draw the bosses b inward, and thereby press the ring J and its packing tight against the shutter A. One of the modifications here shown consists also in placing the ring J without the gate, instead of on its inner side. Figs. 6 and 7 show the same plan of operation and construction, save that the bosses b and screws J are only two in number.

The port-hole or embrasure may be closed both within and without, so as to present a smooth finish with the framing S by means of swinging or other doors, but I have not shown any such fixtures, as they do not form any part of my invention.

The ordnance should be shaped so as to fit the elastic embrasure tightly. The shape of the muzzle of the gun, in order to use it most efficiently with the form of the elastic embrasure which I have shown, should be taper, enlarging backwards from the muzzle. (See Fig. 12.) Ordnance of any contour may be adapted and fitted to be used with this form of embrasure by slipping a collar or band of the proper shape to give the gun the proper taper form.

I claim as new and desire to secure by Letters Patent—

1. An elastic embrasure constructed substantially as shown, for the purpose of forming a water tight joint with the muzzle and sides of ordnance, substantially as above described.

2. The ring J', constructed and operated substantially as above described, for tightening the joints of the port-shutter.

3. The pipe $s$, when applied, as shown, to the seat of the shutter $a$, for the purpose of freeing it of water.

4. The combination of a sliding shutter with an embrasure whose sides are elastic, substantially as above described, for the purpose of firing ordnance under water.

5. An elastic embrasure with double conical sides, as shown, in combination, with a tapering muzzle or tapering sides of the ordnance to be used therewith, substantially as above described.

J. F. CLEU.

Witnesses:
  J. P. HALL,
  M. M. LIVINGSTON.